United States Patent [19]
Vietor

[11] 3,868,497
[45] Feb. 25, 1975

[54] TERMINAL AIRWAYS TRAFFIC CONTROL SYSTEM

[76] Inventor: Carl W. Vietor, 2116 Linda Flora Dr., Los Angeles, Calif. 90024

[22] Filed: Aug. 13, 1973

[21] Appl. No.: 387,930

Related U.S. Application Data

[63] Continuation of Ser. No. 139,370, May 3, 1971, Pat. No. 3,758,765.

[52] U.S. Cl..... 235/150.27, 235/150.2, 235/150.22, 244/77 R, 244/77 A
[51] Int. Cl. ............................................ G06f 15/50
[58] Field of Search... 73/178 T; 235/150.2, 150.22, 235/150.27; 244/77 R, 77 A

[56] References Cited
UNITED STATES PATENTS

| | | | |
|---|---|---|---|
| 3,031,658 | 4/1962 | Green et al. | 235/150.23 X |
| 3,504,165 | 3/1970 | Richardson et al. | 235/150.23 |
| 3,668,403 | 6/1972 | Meilander | 235/150.23 |

Primary Examiner—Eugene G. Botz
Assistant Examiner—R. Stephen Dildine, Jr.

[57] ABSTRACT

A system for scheduling aircraft arrivals from cruise to touchdown, and also for scheduling departures from airport to cruise altitude; wherein space considerations are reserved to the aircraft pilot and wherein time considerations are reserved to the control authority. The aircraft is navigated by the pilot along a Terminal Corridor Route (TCR) in conformance to the requirements of a ground based Traffic Control Computer (TCC). The airborne Aircraft Instrumentation Computer (AIC) includes a programmed computer and an instrument panel display that positions the aircraft relative to an optimum time flexible energy path and responsive to in-flight data which is also telemetered to the TCC for processing. The TCC repeatedly processes all in-range aircraft on a time cycle basis and imposes and regulates time intervals between said aircraft by issuing speed-up and slow-down commands thereto as necessary to qualify said aircraft to proceed, and alerts the control authority and pilot as well of aircraft which do not qualify and/or require corrective proceedures. The system identifies all in-range aircraft and sequentially programs the flight paths thereof along the required track and through waypoints; taking into account the kinetic as well as potential energies involved for executing practical and efficient flight to the ends of infallible traffic control and safety, economy, antipollution and noise abatement.

23 Claims, 7 Drawing Figures

TERMINAL AIRWAYS TRAFFIC CONTROL SYSTEM

This is a continuation of application Ser. No. 139,370, filed May 3, 1971, issued Sept. 11, 1973 as U.S. Pat. No. 3,758,765.

BACKGROUND

This invention is concerned with the scheduling of aircraft and for the complete navigational control and surveillance thereof in relation to an airport or terminal having one or more routes of arrival and/or departure. Although the control over departures is included within the idea of means hereinafter disclosed, scheduled arrivals are of primary concern. That is, airways traffic conjestion in the arrival of many aircraft at a single terminal is the prime problem and one which heretofore has remained unsolved, and with the result that it has been customary for the controlling authority to establish holding patterns, to impose evasive routes and tactics, and/or to simply delay aircraft landings at great expense to the public carrier operating said craft; all of which is contrary to safety, economy, antipollution and noise abatement.

It is the determinable accuracy of scheduling Estimated Times of Arrival (ETA) which has been lacking, since there has been no time consideration by the controlling authority compatible with the space considerations of the piloted aircraft, and vice versa.

FIELD OF INVENTION

It is a general object of this invention to provide a Terminal Airways Traffic Control System wherein the space considerations of the pilot are related compatibly to the time considerations of the controlling authority. In all instances the pilot retains navigational control over the aircraft while the controlling authority retains supervisory control over the assignment of Time Slots (TS) and sequential Estimated Times of Arrival (ETA). Although ETA's will now be determinable with "pinpoint" accuracy, they are nevertheless referred herein as the long established "Estimated" time of arrival.

An object of this invention is to provide an aircraft control concept that processes in-range aircraft regardless of their radial position relative to the terminal involved. Concerning approach to an air terminal, it is also an object to establish a plurality of approach routes, hereinafter referred to as Terminal Corridor Routes (TCR) each radiating from the terminal in various directions, each involving its own course changes and waypoints, and each involving its own altitude requirements.

Another object of this invention is to provide cooperative airborne Aircraft Instrumentation Computer (AIC) and a ground based Traffic Control Computer (TCC) wherein in-flight data is processed and thereby related to programming associated with the navigational route selected by the pilot, in each instance, and all of which is cleared or not cleared by the TCC dependent upon the aircraft position and qualifications.

It is an object of the invention to advantageously employ transponder means to identify an aircraft and relate in-flight data associated therewith, said data being telemetered to the TCC for processing and determination of said processed aircraft as a "Cleared" aircraft or as a "Stranger" aircraft. An aircraft will be cleared providing it qualifies to stay within the time flexible energy path established by the AIC and within tolerance proximity to the TS assigned, when necessary to the TCC; and if the aircraft cannot qualify with the TCC requirements, it then becomes a "Stranger" and is removed temporarily, at least, to monitored surveillance such as to a manual controller.

It is another object of this invention to provide computer programming wherein stored invariable data is related to restored variable data, and all of which is related again to informative and comparative in-flight navigational data directly associated with the aircraft being processed. Said invariable data relates to the TCR requirements and concerns distance or location of waypoints and the altitudes thereof. Said variable data relates to the environmental conditions which affect speed requirements and concerns altitude related wind information as determined by TAS compared with Ground Speed (GS). Said in-flight navigational data is necessarily dynamic and is the information that is updated and compared with the aforementioned invariable and variable data.

It is still another object, therefore, of the present invention to provide a method and cooperative Aircraft Instrumentation Computer (AIC) and a Traffic Control Computer (TCC) whereby the present state of the art Distance Measuring Equipment (DME) and basic altitude and speed (space) indicators with known flight characteristics of the involved aircraft, can be effectively employed to navigate any one or a plurality of aircraft within selected Terminal Corridor Routes (TCR) while selectively assigning each aircraft to an exclusive Time Slot (TS) determining the Estimated Times of Arrival (ETA). It is the operational navigation of all aircraft within the confines of optimum time flexible energy paths which characterizes the present invention; following the teachings of my previous issued U.S. Pat. Nos. 3,496,769 and 3,559,481 which disclose the fundamental airbourne instrumentation utilized herein, wherein kinetic energy in the moving mass of the aircraft and the potential energy in the altitude position thereof are the primary considerations of the aircraft pilot.

It is a further object of this invention to provide a Terminal Airways Traffic Control System of the character thus far referred to that receives current wind information from all in-range aircraft and continuously restores the same as wind-shear variable data related to altitude. This variable data is dynamic and is continuously supplemented and averaged as distinguished from the instantaneous readings heretofore employed.

It is still a further object of this inventive means whereby all in-range aircraft are spaced in timed sequence at more than a minimum of intervals apart. This is the time consideration of the controlling authority who programs the TCC and by which Time Slots (TS) are assigned and the aircraft remain "Cleared" to proceed. All disqualifying aircraft are "Stranger" aircraft and are monitored manually by the controlling authority. In practice, substantially all aircraft will qualify and be automatically "Cleared" while but a small percentage will be disqualified as "Stranger" aircraft; thereby avoiding human errors and minimizing the manpower work load of the controlling authority.

Further, it is an object of this invention to advantageously employ as part of the AIC existent Area Navigational RNAV and/or Inertial guidance equipment which has the capability to triangulate, locate and provide distance measurement to any required waypoints W. Bearing and distance information from the positions of the Omni-DME combination processed by the RNAV equipment creates waypoing positions on the X-Y axes. The vertical Z axis is accounted for in the Vertical Navigational VNAV section of said equipment wherein the altitude information is processed. Thus, bearing, distance and altitude data is inserted into the available RNAV-VNAV computer so as to create waypoints or phantom tracking positions for the Omni stations, and to which waypoints the aircraft can be navigated. Said navigational waypoints are created and shifted in the aircraft AIC independent of the tracking and verification functions of the ground based TCC.

DRAWINGS

The various objects and features of this invention will be fully understood from the following detailed description of the typical preferred form and application thereof, throughout which description reference is made to the accompanying drawings, in which:

FIG. 1a is a general block diagram of the Traffic Control Computer (TCC).

PREFERRED EMBODIMENT

Figure 1:
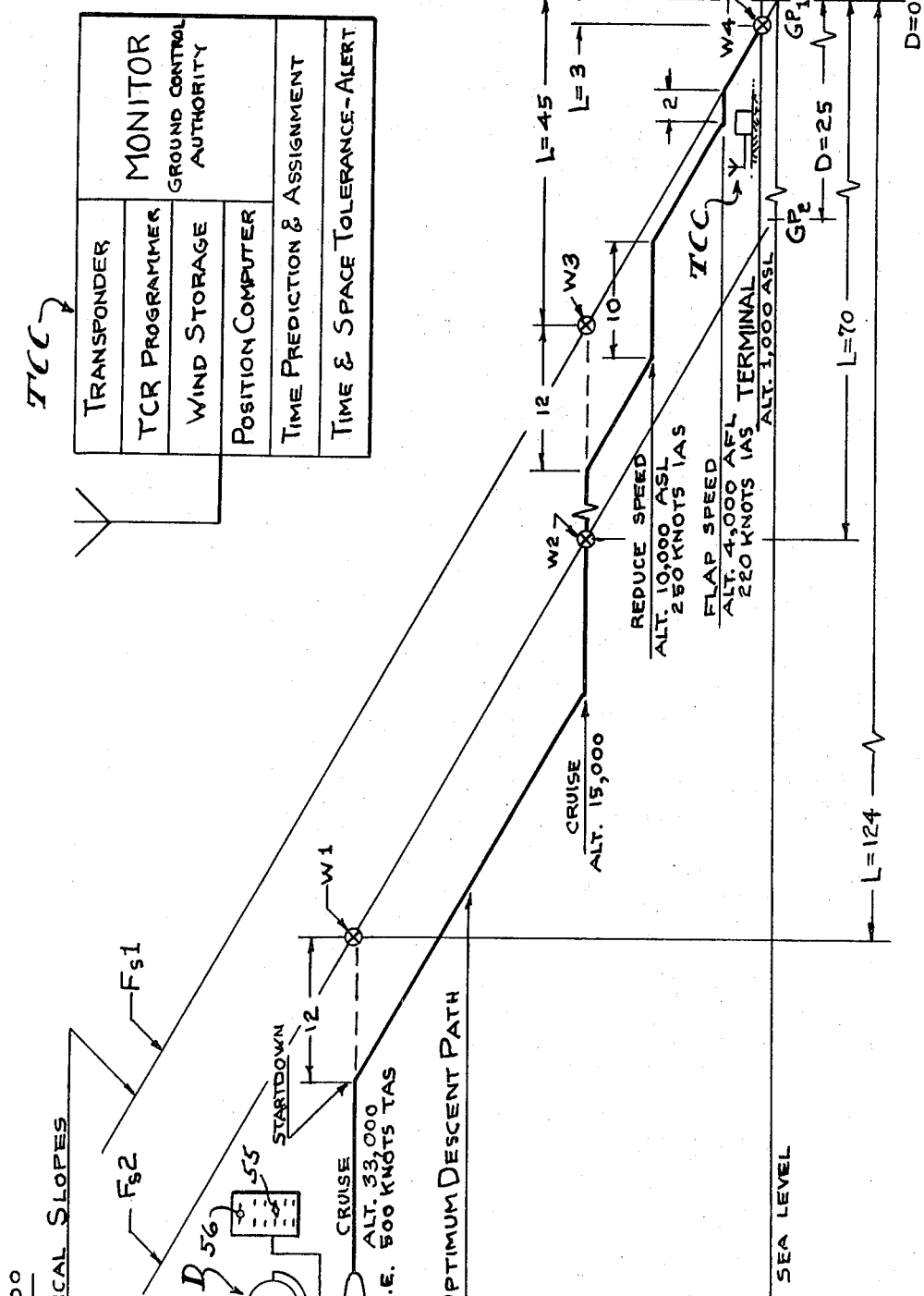
FIG. 1 is a diagrammatic profile illustrating a plurality of theoretical slopes (FS) and the Aircraft Instrumentation Computer (AIC) and the Traffic Control Computer (TCC) as they are associated with the factors involved.

In the drawings I have illustrated diagrammatically and graphically the present invention as it is applied with present day aircraft equipment. That is, the known components are those which are being currently used and improved; including an altitude indicator A, a speed indicator B, a true airspeed indicator J, and Distance Measuring Equipment C. Elements A, B, J and C involve known pieces of equipment and are capable of delivering, for example, an electrical signal in the form of a voltage output; the altitude indicator A being corrected for barometric pressure and temperature changes; the speed indicator B being an airspeed or Mach indicator; the true airspeed indicator J being temperature and pressure corrected; and the Distance Measuring Equipment C being self-corrective and reliably operative when tuned onto cooperative ground located DME. Therefore, without showing and without describing the details of these three basic pieces of equipment, it is to be understood that they are in each instance used, in carrying out the present invention, as commercially available equipment. In face, each of these known pieces of equipment are invariably installed and available in a fully instrumented aircraft.

There are two purposeful concepts involved with the present invention; firstly, the airborne computerized instrumentation for space considerations by the pilot, and secondly the ground or remote based computerization of in-flight data for tracking and time and clearance considerations by the controlling authority. Concerning the first purposeful concept, the raw data derived from the AIC or "Airborne Instrumentation Computer" is used by the pilot and/or auto-pilot of the aircraft, and in the following description I will refer to the system as it relates to an Approach-Descent and Profile Rate Indicator and herein referred to as a Profile Indicator D which performs every function of a rate-of-climb indicator which it is to replace, and additional functions as well. Therefore, in addition to the usual rate-of-climb and/or descent needle 10, the Profile Indicator D has a profile needle 11 and a groundspeed-slope pointer 12. It is significant that there are these three cooperative variables, the needles 10 and 11 and the groundspeed-slope pointer 12; and it is when the positions of the needle 11 and pointer 12 coincide that the natural and/or actual and/or energy path of the aircraft is properly related to the predetermined total energy slope at which the aircraft must be properly oriented in order to accomplish an efficient descent-approach. This is then accomplished by changing the attitude of the aircraft so that the rate of climb and descent needle 10 is over the same position as needle 11 and pointer 12, thereby effecting a cooperative relationship between all three movable elements 10, 11 and 12. In accordance with the invention, therefore, the Profile Indicator D involves, generally, a rate-of-climb and descent responsive means X, a profile responsive means Y, and a slope responsive means Z; and all of which are cooperatively combined in one case having calibrations relative to which the elements 10, 11 and 12 operate for comparative observation by the pilot.

The rate-of-climb and descent responsive means X is a usual rate-of-climb and descent indicator of the type commonly employed in aircraft. Such an indicator involves a visible fixed card 15 of circular configuration, over which the centrally pivoted needle 10 turns. The card 15 is calibrated for the number of feet of climb or descent, in opposite directions from an "0" point located horizontally to the left of the card 15, the rate-of-climb being above the "0" in a clockwise direction, and the rate of descent being below the "0" in a counter-clockwise direction.

The needle 10 is therefore at "0" when the aircraft is inertially at rest (level flight) in this respect. In practice, the rate-of-climb and descent needle 10 is a single bar, so as to be readily distinguishable from the profile needle 11 which is a double bar or V-shaped. The drive for needle 11 is a Selsyn motor or the like and the rate mechanism for needle 10 is of the usual construction (not shown) either remote or built into the instrument per se as circumstances require. It will be understood how a usual instrument mechanism can be employed to properly position the needle 10.

The profile responsive means Y involves among other things later to be described, true groundspeed indicator as a result of the functions that are available from the Distance Measuring Equipment, and in this respect I refer to computerized DME information that indicates the true groundspeed. It is to be understood that there are various known ways and means by which to arrive at a signal representing true groundspeed, and any one of such ways and means can be employed in practicing this invention. Therefore, when reference is made to a "speed indicator", it is to be understood that a "groundspeed indicator" can be employed, as circumstances require.

The deceleration comparator G is a programmed means which recognizes the deceleration characteristics of aircraft in the family thereof under consideration. For example typical present day jet transport aircraft decelerate from cruise speed to flap speed in a horizontal flight and still air at 10,000 ft. altitude (at landing weights) in a distance of 10 miles, when at idle thrust. Therefore, the deceleration comparator G has an output that is set to go to a zero voltage when the aircraft slows to a predetermined minimum speed, for example flap speed. As shown, the deceleration comparator G has and output line 25 that has a negative voltage effective so as to prolong the theoretical glide path a distance equivalent to that which is required for an idle thrust slow-down from a cruise to said predetermined minumum speed. As shown, in its preferred form the deceleration comparator G feeds a computed voltage into an amplifier 43. A basic factor signal is channeled to the deceleration comparator G; through a line 122 from the altitude indicator A and a corrective signal is channeled thereto through a line 118 from the DME rate of change indicator 17, and all of which is processed for the establishment of a distance offset or slow-down factor signal that then feeds into the summator H. The altitude information through line 122 provides the fundamental basis for establishing a deceleration factor from cruise speed to maximum predetermined minimum or flap speed in still air and which varies as a function of altitude. In this respect, graphic curves are developed and established for each particular aircraft, and namely one a cruise speed curve (usually in Mach number) that gives the true airspeed for a given altitude, and namely another a predetermined minimum speed curve (usually in airspeed) that gives the true airspeed for a given altitude. These two curves are related and the functional difference between the two is proportionate to distances at operational altitudes to show the distance factor necessary for slow-down of the particular aircraft involved, and to this end a deceleration factor is established (for the particular aircraft involved) and which varies with altitude and which is correct for still air and/or normal conditions.

A typical circuit for establishing this standard deceleration factor is illustrated in the deceleration comparator G wherein there are three variable voltage means, one a pair of variable resistances 126 and 126', each having the characteristics of the cruise speed curve for example a Mach .85 curve for all altitudes, second a variable resistance 127 having the characteristics of the predetermined minimum speed curve, for example, a 200 indicated airspeed curve for all altitudes, and a variable resistance 128 having the characteristics of known groundspeed. The resistances 126, 126', 127 and 128 are powered or biased by suitable power supplies (not shown) and in each instances to establish the high, low and variable signals therebetween. The cruise speed (126) Mach .85 curve is in practice a straight line function, and although the predetermined minimum speed (127) 200 IAS is a true curve it is for all practical purposes a straight line function and is treated as such. Accordingly, the basic altitude function is to affect the variable output of resistances 126, 126' and 127, and to this end the altitude information through line 122 simultaneously and correspondingly shifts the output of the resistances 126 and 127 and collects them to be fed through line 25. The resistance 126' is affected simultaneously by the altitude information through line 119, as shown. As hereinabove stated, the cruise speed in Mach .85 (or other Mach value) represents true airspeed and for all practical purposes for all altitudes, and therefore the above described affect of the altitude information through line 122 correspondingly affects the variable resistances 127 representing the function of an indicated airspeed (and close approximation thereof even at low altitudes) to which known groundspeed can be related so as to establish any differential or offset which may exist. In this later respect therefore, the rate of change information of the rate indicator 17 through line 118 shifts the output of the resistance 128 and collects it and the separately affected output resistance 126', for comparison, and feeds the resultant through line 25 for correction of the still air signal derived from the balance between resistances 126 and 127. Thus, the slow-down to predetermined minimum speed or flap speed and the winds which invariably offset the aircraft speed are automatically compensated for.

The slope responsive means Z directly utilizes the voltage output of the rate of change indicator 17 which is part of the Distance Measuring Equipment C, through a line 18, and this voltage is used to position the groundspeed-slope pointer 12 which involves a geometrical configuration which is readily distinguishable from the two needles 10 and 11. In practice, a delta-shaped pointer 12 is provided and which moves within the descent calibrations of the card 15 to indicate the true groundspeed as well as to indicate the correct rate of descent required in order to remain on the correct slope. The groundspeed-slope pointer 12 operates concentric with the needles 10 and 11, the inner point thereof being registerable with the point of the profile needle 11 and the outer point thereof being operable within a range of groundspeed calibrations fixedly engraved, or the like, in the peripheral bezel portion of the instrument case.

In accordance with the invention the groundspeed-slope pointer 12 is responsive solely to the output of the DME rate of change indicator 17 from output line 18. However, the profile needle 11 is responsive to the integrated output of the combined variables including; said rate of change voltage from output line 18; the output of the altitude indicator A, the output of the deceleration comparator G, and the output of the Distance Measuring Equipment C. Further, the variables integrated and fed to the drive for the profile needle 11 includes the altitude offset (Aw) or displacement output of the Vertical Navigation (VNAV) equipment and the distance offset or displacement output of the Area Navigation (RNAV) equipment, later to be described. Finally, the deceleration variable output is included in the said integration, reference being made to the output of the deceleration comparator G, all said variables being processed by a summator H and having a single output line 19 to the drive of the profile needle 11. The said drive can vary as circumstances require and in its basic form can be considered to be a voltage responsive meter-type instrument or Selsyn motor capable of advancing and/or retracting the needle 11 dependent upon the voltage applied. Similarly, a drive for placing the groundspeed-slope pointer 12 can be considered the same, as a voltage responsive meter-type instrument or Selsyn motor capable of advancing and/or retracting the pointer 12 dependent upon the voltage applied.

The altitude indicator A is of the usual available type, being corrected for barometric and temperature variations, and provided with a transducer or the like so as to convert pressure indications into voltage signals. The altitude indicator A has an output line 22 that parallels the output line 18 above described.

The altitude offset for displacement is adjusted by means of the VNAV equipment which enables the pilot to compensate for the altitude of the airport or required waypoint. The output of the altitude indicator A is shown as a negative voltage, in which case the output voltage of the altitude offset or displacement is a positive voltage, determined at the VNAV equipment as by means of a manually or automatically positioned control in order to add the height of the waypoint or airport-touchdown point, giving it a corrected placement above sea level.

The radial distance offset or displacement is adjusted by means of the RNAV equipment which enables the pilot to compensate for the horizontal offset of the airport or touchdown or waypoint relative to the VOR and DME stations to which the aircraft instrumentation is tuned. The output of the Distance Measurement Equipment C is shown primarily as a negative voltage adapted to be reversed in polarity dependent upon the VOR-DME station location, all of which is determined in the RNAV equipment dependent upon whether, for example, the distance of the VOR-DME station is before or beyond the waypoint or actual touchdown point.

From the foregoing, it will be seen that in-flight navigational data is available from the existing aircraft instruments, including the RNAV and VNAV equipment being produced as variable voltages, and which are adjustably affected by the deceleration comparator G. In practice, the combined instrument controlling voltages from the said means is a minus voltage, and dependent upon the capability of each of the various instruments gain amplifiers can be employed as indicated. For example, I employ suitable gain amplifiers in the output lines 18, 22 and 23 which are fed into the summator H where the outputs are properly balanced relative to each other by means of a computer comprised of parallel resistors 38, 40, 41 and 42, or the like, which collectively feed into a profile amplifier 43 that powers the means that motivates the profile needle 11. As hereinabove described, the profile needle 11 is positioned as by means of a Selsyn motor that is responsive to the variable voltage and thereby places said needle.

A capability factor of all present day jet transports is the glide component of approximately 3 miles forward for each thousand feet of descent when operating from 250 knots indicated to some lower speed below 200 knots, for instance between 250 knots and 185 knots, while faster or slower speeds require energy application in order to maintain this path. Another capability is the deceleration component of the flight path which is computed in level flight with idle thrust at maximum landing weights, and on an average this deceleration component will require a predeterminable time interval to slow to a predicted speed. For instance, if the predicted or minimum speed is determined as 200 knots this time interval will be 1 minute and 30 seconds being required to decelerate to 250 knots from full cruise at 10,000 altitude, and 1 minute being required to decelerate from 250 knots to 200 knots. These capabilities of all the modern jet transports are so similar that standard figures relating thereto can be programmed into the TCC and applied to all in-range aircraft processed thereby, any differences in the actual glide or deceleration capabilities of each aircraft being tolerable within the system.

It is the "aircraft capability" or total energy which is indicated and programmed by this Terminal Airways Traffic Control System and the formula as set forth in my said previous Letters Patent prevails as follows:

Aircraft Capability $= S\,(A/1{,}000) + K\,\sqrt{(dD/dT)} - F_s$ wherein $S$ is the slope constant, $A$ is the aircraft altitude, $K$ is the aircraft slow-down factor or conversion constant, $D$ is the distance, $T$ is time, $d$ is instantaneous rate of change, and $F_s$ is the predetermined minimum speed. It is to be understood that displacement of altitude and distance are made by the adjustments hereinabove described. The "aircraft capability" is represented generally in said basic formula wherein the slope times the altitude is divided by 1,000 and to which is added the aircraft slowdown factor or conversion constant times the square root of the groundspeed minus the predetermined minimum speed. Fundamentally therefore, the "aircraft capability" is the total energy available in said aircraft by virtue of its total in-flight condition and which includes the kinetic as well as potential energy in said aircraft, primarily at start of descent and secondarily entirely through the descent-approach. And, it is said "aircraft capability" which is represented by the position of the profile needle 11 and which is maintained coincidental with the groundspeed-slope pointer 12 by the pilot and/or autopilot for the execution of optimum and thereby most efficient descent approach.

The "Aircraft Capability" of the formula (above) is synonomous with the value representing computed aircraft position or distance to a waypoint ($P_w$); and the instantaneous rate of change in Distance over Time ($dD/dT$) is synonomous with the value representing Groundspeed ($GS$). Therefore, in implementing the improvements of the present invention the following augmented formulas are utilized for computing the optimum position of the aircraft:

ascent $P_{wc} = S\,(A_w - A/1{,}000) + K\,(GS - F_s)\ {\scriptstyle lim=0};$ and descent $P_{wd} = S\,(A - A_w/1{,}000) + K\,(GS - F_s)\ {\scriptstyle lim=0}$ wherein $P_w$ is the computed position of the aircraft from a waypoint, wherein $K$ is the variable conversion factor, wherein $GS$ is as above stated and wherein $A_w$ is the waypoint altitude; and in referring to FIG. 1 of the drawings it will be observed that there is a series of waypoints W1 to W4 in the typical composite of two theoretical slopes shown. In each case, the theoretical slope intersects sea level at a groundpoint GP. D is the displacement of a groundpoint from the groundpoint of the terminal $F_s$ path and determines the location of said offset path relative to said $F_s$ path. L is the distance of the waypoint measured from sea level groundpoint (GP) at the end of the $F_s$ path through the terminal.

It will be observed that both the groundspeedslope pointer 12 and profile needle 11 respond in position to the rate of change signal through line 18 from the Distance Measuring Equipment C. Consequently, the pointer 12 and needle 11 would coincide in position if it were not for other factors which must be introduced; namely altitude, remaining distance and slowdown factors and adjustments and variations thereof. It is significant that the basic and controlling factors are derived from the efficient and reliable instrumentation available in aircraft with virtually no modification thereof, and with the provision of a read-out that is advantageously incorporated into one of the well-known and reliable existing aircraft instruments; namely the "climb and descent indicator" and which is now referred to additionally as a "Profile Indicator D." In all instances, the apparatus is responsive to the altitude bearing and distance to the waypoint of interest of the aircraft and the groundspeed-slope pointer 12 will invariably indicate the required positioning of the profile needle 11 for placing the aircraft within the predetermined ideal and proper descent-approach slope. As a result, the "total energy" concept is exploited, utilizing in-flight "aircraft capability" and which is made available for both space and time considerations.

The instrumentation and method thus far described is disclosed to some extent in my two aforementioned issued patents, and in accordance with the second purposeful concept of the present invention I have cooperatively utilized additional means therein and have combined therewith a cooperative ground based TCC or "Traffic Control Computer" responsive to the above described AIC or "Airborne Instrumentation Computer" and programmed to process a multiplicity of approaching aircraft. The data derived from the AIC "Airborne Instrumentation Computer" is identified by means of transponder and telemetering thereof triggered by a discrete call from the ground based TCC and is received thereby for processing and verification; to relate to aircraft identity, to sequentially commutate with each in-range identified aircraft and correlate it with a multiplicity of other aircraft by assigning each to an exclusive Time Slot (TS), to apply involved programming to the identified aircraft, to predict an optimum time flexible energy path for the identified aircraft, to show the position of the identified aircraft ahead or behind said energy path, to alert the pilot of the identified aircraft to speed-time adjustment as required in order to remain within said energy path, to cancel the selected TCR of any identified aircraft straying to an intolerable position from its assigned Time Slot (TS) and to alert the control authority to its presence as a "Stranger" aircraft (SA), and also to issue a warning to both the aircraft pilot and control authority of any malfunction made apparent by a discrepancy. Accordingly and in addition to the AIC components thus far described, included therein is a True Air Speed (TAS) computer means J, a Terminal Corridor Route (TCR) selector and waypoint computer means K, transponder means L, telemetering means M, transmitter and receiver means N, and a speed requirement and malfunction readout means P. These means are cooperatively associated with the navigational instrumentation thus far described and produce dynamic navigational data to be processed by the TCC.

The Traffic Control Computer operates so as to eliminate time of arrival conflicts (two or more aircraft predicted to arrive at the terminal within a predetermined time interval), a separated Time Slot (TS) being assigned for each in-flight aircraft; all of which is commutated for individual processing of each aircraft on approach within the range of the TCC involved. As a practical matter, the traffic pattern reaches in omni directions from the airport runway and up the multiplicity of theoretical slopes to the elevation of any one of the in-range approaching aircraft on its selected TCR. For example, an operational in-range radius of 190 miles is presently feasible, and this is equivalent of a 60,000 foot cruise altitude thereby including all present day aircraft.

The TAS or "True Air Speed" computer means J is a component that is responsive to the indicated air speed indicator B through a lead 44 and as well to the altitude and temperature factors. Therefore, the TAS computer means J is shown as being responsive to the altitude indicator A through a lead 45 and responsive to a temperature sensor means TS through a lead 46. It will be readily apparent that the TAS computer means J will produce a corrected and/or true air speed for any prevailing altitude and temperature condition. As shown, the TAS signal is transmitted through an output line 52.

The TCR or "Terminal Corridor Route" selector and waypoint computer means K is a component that is selectively adjustable to any one of a plurality of assigned TCR's at the terminal involved, and it comprises Area Navigation (RNAV) equipment, a programmer 47 and a waypoint shifting means 48. For example, there may be as many as 10 assigned or standard TCR's radiating from an air terminal, in which case the programmer 47 has a multi-position switch manually adjustable by the pilot to any one TCR program inserted therein as indicated. Alternately, the selected TCR program can be individually inserted or produced from a remote source in lieu of a selector switch adjustment. As shown, the TCR signal is transmitted through an output line 49.

Figure 2:
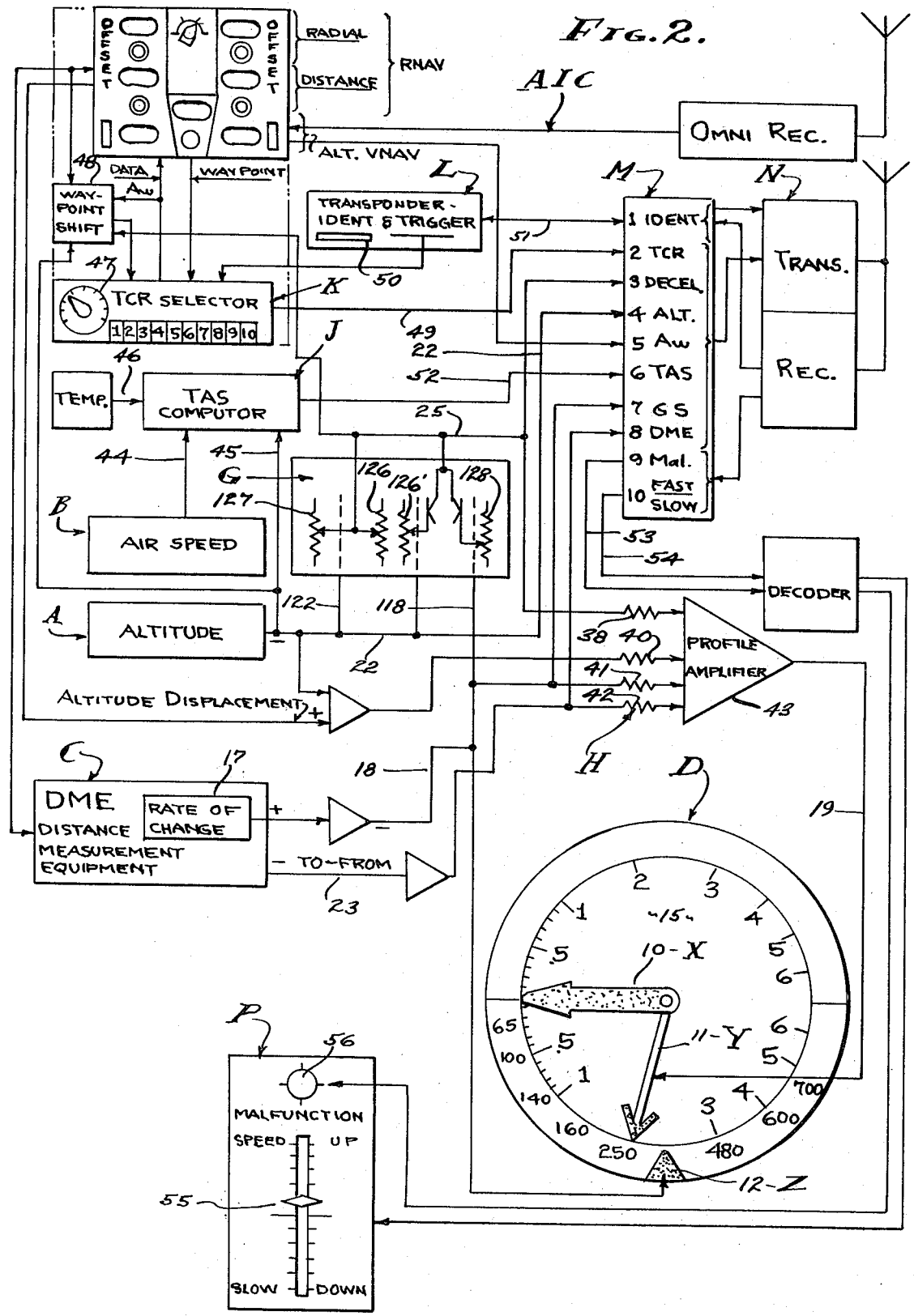
FIG. 2 is a detailed block diagram of the Aircraft Instrumentation Computer (AIC), illustrating the instruments utilized by the aircraft pilot and showing the transmitter and receiver for cooperatively telemetering navigational data to the TCC.
Figure 3:
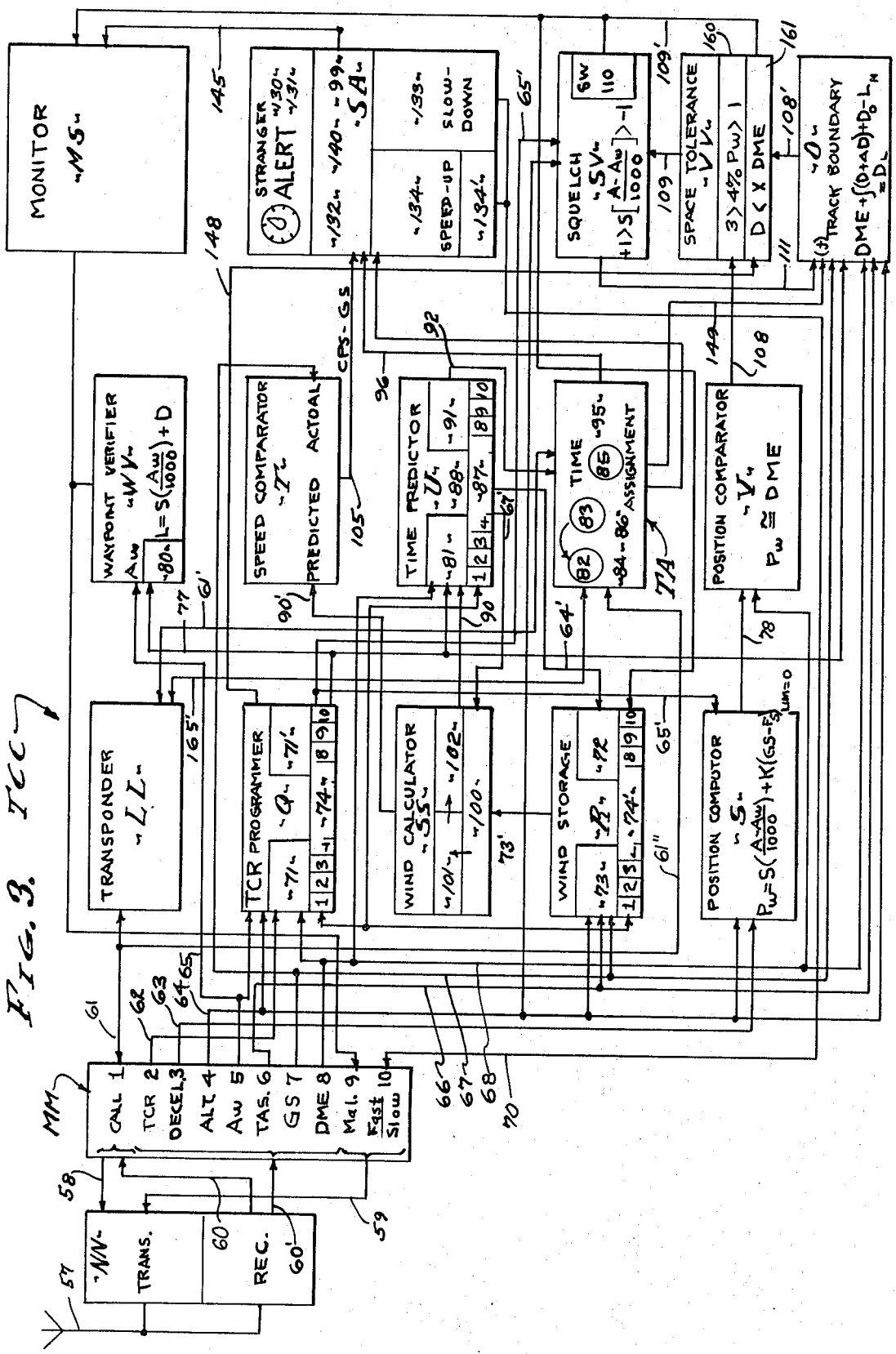
FIG. 3 is a detailed block diagram of the Traffic Control Computer (TCC), showing the transmitter and receiver for cooperatively telemetering navigational data to the processed aircraft.

Referring now to the Area Navigation (RNAV) and Vertical Navigation (VNAV), the bearing (radial) and distance from one or more Omni-DME stations may be involved (see FIG. 2) and is inserted into the RNAV computer so as to establish the $x$–$y$ axes and tracking positions or waypoints. In FIG. 1 of the drawings, four such waypoints W1–W4 are shown and the requirements for which are invariably impresses as permanent sequentially available data in the TCR programmer. That is, the frequency tuning, bearing, distance and altitude data is independently available from the programmer 47 for each waypoint and operable to adjust the RNAV-VNAV computer for the calculations necessary to triangulate and establish the waypoint position and altitude to be crossed by the aircraft.

A feature of the system is the absence of predetermined cruise altitude data for W1 and which can be supplied only from altitude information available before entering the TCR. The waypoint shifting means 48 is reponsive to altitude change when at and approaching waypoint altitudes such as W1 and W3, and includes a blocking means that is active until the DME reads less than a predetermined minimum such as, for example, the 12 mile deceleration requirement, and is always responsive to crossing waypoints such as W2 and W4 (see FIG. 1); and to this end the means 48 is a dual channel means that senses both altitude change and/or arrival at the waypoint of destination, and in either instance the programmer 47 is then activated by said occurrence so as to be advanced to the next waypoint data impressed thereon. Thus, sequential waypoints as may be required are programmed to be sequentially calculated and established by the computer of the RNAV-VNAV equipment.

The transponder means L is an identity source that is responsive to a discrete call initiated by the pilot or triggered by the ground or remote based transponder means LL of the TCC. The transponder means L and LL are of the type available for identifying individual aircraft by codes that are selectively employed by the aircraft pilots and the transmission thereof triggered by a discrete call, and according to the present invention to telemeter navigational data to and return signals from the TCC. Each transponding aircraft need but to supply an identifying code and a telemetered signal triggered by the transponder discrete call and which includes the selected TCR data and all in-flight navigational data to be processed. The code and identity can be supplied by a suitable circuit board 50 or the like shown installed in the transponder means L; the discrete call signal and the code identity signals established thereby being transmitted through an output line 51.

The telemetering means M is a component that simultaneously receives a multiplicity of separate signals and transmits them sequentially by radio to be processed by the telemetering means MM for subsequent distribution and assimilation in the same order in which they are originally separated. In the form illustrated, there are eight separate output signals numbered throughout the drawings (1) through (8): (1) The code and Ident signal through output line 51; (2) A TCR or "Terminal Corridor Route" selection signal through output line 49; (3) A deceleration signal through output line 25; (4) An altimeter signal through output line 22; (5) A waypoint altitude signal through output line 22''; (6) A TAS or "True Air Speed" signal through output line 52; (7) A GS or "Groundspeed" signal through output line 18; and (8) A DME or remaining distance signal through output line 23. The above enumerated output lines transmit the navigational information necessary for the cooperative operation of the TCC hereinafter described, said multiplicity of output signals being assimilated in the telemetering means MM and sequentially repeated as individual signals. Further, there are two input signals numbered (9) and (10); the former being a malfunction signal through line 53, and the latter being a Slow-Fast signal through line 54.

The transmitter and receiver means N is a component that transmits and receives the signals (1) through (10) for reception and processing by the TCC or "Traffic Control Computer," and that receives a discrete call for transponder operation and triggering transmission of telemetered navigational data, and for operation of the Slow-Fast readout means P. The radio transmitter and receiver can be built and incorporated in the aircraft in the usual manner and operated on assigned frequencies for exclusive radio transmission. There is an antenna common thereto, the receiver section having output lines that feed back to the Channels (1), (9) and (10) of telemetering means M.

The altitude of waypoint W1 is manually and automatically adjustable in the VNAV equipment to any pilot selected altitude and is utilized in approaching the said first waypoint along the first theoretical slope $F_s$. Initially, the TCC has not processed the approaching aircraft which has come into range, and the pilot, therefore, inserts a fixed altitude value into the VNAV, his prevailing cruise altitude, to be employed in establishing his approach toward said first waypoint W1 and activates the ident feature of the transponder means. This $A_w$ signal out of the VNAV is a variable voltage through line 22''.

The speed requirement and malfunction readout means P is preferably an instrument panel component that transforms a coded TCC speed requirement signal (10), a readout and/or auto-pilot (auto-throttle) control force and a malfunction signal (9) into pilot oriented information. As illustrated, the means P is a graphic readout that responds to the feedback signal (10) to produce an indicator 55 position designating the precise speed-time adjustment required in order to return to the optimum flexible energy path of the assigned TCR; and that responds to the feedback signal (9) to illuminate a light 56. The readout forms of means P can vary as circumstances require being responsive to the repeated reception of a signal value in order to remain active.

Referring now to the TCC or "Traffic Control Computer" which characterizes this invention, said apparatus is ground or remote based and transmits and receives regardless of its position relative to air terminal location, it being significant that all navigational data to be processed emanates from the AIC "Airborne Instrumentation Computer" hereinabove described. The TCC includes a transmitter and receiver means NN, a telemetering means MM, a transponder means LL, a route selection programmer means Q, wind storage means R, a position computer S, a wind scan calculator and summator means SS, a waypoint verifying means WV, a speed comparator means T, a time prediction means U, a time assignment means TA, a position comparator V, track boundary means O, a space tolerance means VV, a squelch means SV, a stranger alert means SA, and monitor and surveillance means MS. These components are cooperatively related as shown and discriminately process the in-flight navigational data signals (1) through (8) and responsively issue a malfunction signal (9) and a slow-fast requirement (10), and alert the monitor and surveillance means MS of "stranger" aircraft which cannot qualify to descend within the applied TCR.

The transmitter and receiver means NN is a component that receives the navigational data signals (1) through (8) for sequential separation by the means MM that transmits and receives the transponder signals for identifying the in-flight aircraft and for triggering the navigational data therefrom, and that transmits the feedback signals (9) and (10). The radio transmitter and receiver can be located at the air terminal as a ground installation in the usual manner and operated on said assigned and exclusive frequencies tuned to the aforementioned means N. There is an antenna 57 common thereto, the transmitter section having an input line 58 that transmits transponder signals, and an input line 59 that transmits the malfunction (9) and slow-fast requirement (10) signals. As shown, the receiver section has an output line 60 that transmits transponder signals, and an output line 60' that transmits the remaining signals to the telemetering means MM.

The telemetering means MM is a component that sequentially receives a multiplicity of distinct signals transmitted by the telemetering means M and connects them to distribution and assimilation lines 61 through 68 in the order in which they were originally separated by said means M. In the form illustrated, the eight navigational information signals are distributed as follows:

(1) The Ident and call signals through distribution line 61;
(2) The TCR selection signal through distribution line 62,
(3) The deceleration signal through distribution line 63,
(4) The altimeter signal through distribution line 64,
(5) The waypoint altitude signal through distribution line 65,
(6) The TAS signal through line 66,
(7) The GS signal through distribution line 67,
(8) The DME signal through distribution line 68. The two feedback signals are assimilated as follows:
(9) The malfunction signal through assimilation line 69,
(10) The slow-fast signal through assimilation line 70.

It is to be understood that the operationn of the telemetering means MM is repetitive and synchronous and with means to retain and simultaneously apply said multiplicity of signals, all as circumstances require.

The transponder means LL and the transponder means L are components that operate in conjunction with each other to identify the involved aircraft and periodically trigger the processes of analysis with a discrete call, whereby telemetered signals are processed by the TCC and the malfunction and slow-fast signals transmitted to the said aircraft and/or to the ground controller, as may be required. The transponder means LL receives the Ident signal through distribution line 61 and functions as a signal detector and decoder; that detects and retains the code information portion of the signal specifically identifying the transponding aircraft. The detected Ident signal is retained by means of a memory circuit and is subsequentially utilized at periodic intervals in a discrete call to that identified aircraft, thereby to trigger navigational data from the aircraft instrumentation computer AIC.

In practice, a multiplicity of aircraft apply their Ident signals to the memory circuit of the transponder means LL, the memory circuit recording the Ident signals sequentially as they are received and holding the recorded Ident signals for subsequent sequential discrete calls. Means separates the discrete calls and repeatedly dispatches them sequentially at periodic intervals, say for example every 10 seconds; and in this way each involved and/or identified aircraft is triggered and/or called up every 10 seconds. Simultaneously with each identified triggering of an aircraft by means of a discrete call, the transponder means activates the telemetering means N of the identified aircraft for the transmission of navigational and space consideration signals (see means TA).

A typical TCR profile is illustrated in FIG. 1 of the drawings and involves two theoretical slopes $F_s2$ and $F_s1$. The cruise altitude is shown as 33,000 feet while the terminal elevation is shown as 1,000 feet, and therefore the GP of $F_s1$ is 3 miles beyond the point of touchdown. The initial waypoint W1 is shown on $F_s2$ and displaced 124 miles (value L) from the GP of $F_s1$, the two theoretical profiles being parallel one with the other and spaced horizontally 25 miles (value D) apart. In the profile shown, the aircraft is operated at a normal cruise speed to a phantom waypoint W1 on $F_s2$ at cruise altitude, through a waypoint W2 on $F_s2$ at a corridor bypass (for example) altitude of 15,000 feet, to a phantom waypoint W3 on $F_s1$ at said terminal corridor bypass altitude and the waypoint W4 on the final approach portion of $F_s1$.

In accordance with the time flexible energy concept employed herein, the aircraft capability formula is applied to theoretical slope $F_s2$ the same as it is applied to $F_s1$ by including the D and L factors as follows: the example values concerning W2 being $D = 25$, $L = 70$, W2 altitude = 15,000, $S = 3$ (see FIG. 1) and applying the prevailing winds and the formula factor K times the function of $(GS - F_s)$ limited to zero the total slowdown value in miles may be 12, which can be utilized in arriving at W2 within the time flexible energy profile. Therefore, the actual descent of the aircraft to altitude of 15,000 feet can be initiated 12 miles before reaching W1.

Upon reaching a point 12 miles before W1 (the deceleration requirement) $DME - K(GS - F_s)_{lim=0} = 0$ the waypoint shift squelch circuit opens and the waypoint shifting means 48 advances programmer 47 from W1 data to W2 data. When the aircraft reaches 15,000 feet and the diminishing DME value of the RNAV equipment reaches its lowest value such as 12 miles, the shifting means 48 senses said arrival and advances the programmer 47 to W3 provided the altitude of the aircraft is within tolerable limits of W2 requirements. If not the altitude waypoint shift squelch circuit will not open until it is or the shift will occur at W2 or the lowest positive value of W2. Again, upon reaching the deceleration requirement distance the waypoint shifting means 48 advances the programmer 47 from W3 data to W4 data. The remaining slowdown involves the maximum 250 knot speed requirement at and beneath 10,000 feet altitude and the predetermined minimum speed requirements before final approach. The maximum speed of 250 knots indicated is maintained, for example, in the descent to 4,000 feet above the terminal where horizontal flight is again resumed at reduced or idle thrust for slowdown to predetermined minimum speed of, for example IAS of 200 knots, which ideally and in practice will be reached upon arrival at the $F_s1$ theoretical slope and at which point and thereafter the aircraft flight path will coincide with the theoretical slope $F_s1$ on final approach to the touchdown waypoint W4. At W4 the RNAV remaining distance readout will have reached zero, and which is verified as the aircraft touches the runway of destination.

The route selection and programmer means Q is a component that contains the tracking data necessary for coordinated comparison with the in-flight progress of the individual aircraft being processed. Like the above described TCR selector and waypoint computer means K, the means Q is adjustable to anyone of a plurality of assigned TCR's at the terminal involved, and it comprises a program selector means 71 and a waypoint shifting means 71'. For example, there are ten TCR programs 74 corresponding respectively with the ten aforementioned TCR programs installed in the means K, as is indicated. The program selector means 71 is responsive to the TCR selection signal through distribution line 62 and involves a decoder which identifies the program selected in means K and activates the corresponding program 74 installed in said means Q. The program selector means is also responsive to the waypoint identification and shift signal through line 62, and to the $A_w$ signal through line 65. $A_w$ goes into the means Q to trigger the associated L and D factors and means Q to trigger the associated L and D factors stored in the corresponding waypoint altitude factors stored in the corresponding program 74. L and D feed from means Q to Verification means WV, while $A_w$ feeds from means Q to position computer S.

Referring now to the TCR which is described herein as a typical example, the four waypoints established and through which the processed aircraft must pass, within tolerance, are related to the time flexible energy path $F_s$. In practice, the $F_s$ path defines a corridor ceiling limit while the optimum descent path defines a floor. All of the waypoints and the terminal are located on an $F_s$ path. The offset of the optimum descent from these $F_s$ paths is created by the deceleration requirements at idle thrust in distance traveled along the horizontal axis from the cruise speed to a predetermined minimum speed. The vertical axis represents the altitude trade-off for the speed loss relative to the predetermined slope which takes into account the aircraft aerodynamics. Therefore, $F_s$ is a boundary that should not be penetrated, while penetration below the optimum descent path can be tolerated; and in accordance with the invention each program of a TCR is invariably impressed with sequentially available formula data for each waypoint therealong as follows:

$$L = S (A_w/1,000) + D$$

The programmed waypoint formula data stored in the route selection programmer and means Q is two dimensional, involving waypoint altitude and remaining distance to the waypoint being approached, and the optimum flight path profile of the TCR is established thereby and which is to be conformed to. The programmer means Q having been adjusted to the corresponding selected TCR program of means K in the AIC, has the four example waypoints W1 to W4 as shown in FIG. 1. Therefore, the waypoint altitude $A_w$ for W1 is selected by the pilot adjustment of the VNAV computer as 33,000 feet when he initiates the participation of his AIC with the TCC; a feature of the system being the absence of this data from the programmed formula for W1 and which can be supplied only from altitude information available to the pilot before entering the TCR of his selection. The invariable programmed factors of said formula are $S = 3$ and $D = 25$, and consequently the placement of W1 is $L = 124$ miles from the GP of $F_s 1$. However, the Profile Indicator hereinabove described will tell the pilot when the aircraft reaches the optimum energy path of $F_s 2$, and because 12 miles is required in order to slow down to predetermined minimum speed, the said path will be reached at 136 miles from the GP of $F_s 1$. Therefore, when 136 miles from the GP of $F_s 1$, ($DME - 12$ miles to W3) the pilot in obeyance to the Profile Indicator D throttles back as necessary and descends at cruise speed to the 15,000 feet level as is required of the TCR; while making speed and altitude corrections as may be necessary to remain within the theoretical slope $F_s 2$ as is required by the said Profile Indicator D.

In accordance with the invention the route selection and programmer means Q operates dependently of the TCR selector and waypoint computer means K, and accordingly means Q involves the waypoint shifting means 71' that is responsive to a waypoint shift signal when the aricraft is approaching waypoints such as W1 and W3 and to crossing waypoints such as W2 and W4 (see FIG. 1); and to this end the means 48 is a dual channel means that senses both altitude change and/or arrival at a waypoint or destination, and in either instance the program memory stored in means Q is advanced to the next waypoint data impressed thereon. The waypoints shifting means 48 is responsive to $DME - K(GS - F_s)_{lim=0} = 0$; while the altitude change sensing of means 48 is responsive to preset altitude change as expressed by the formula $S (A - A_w/1,000) < -1$ for example, and too squelch means responsive to deceleration requirements when $A = A_w$ (aircraft in level flight). Therefore, when $DME - K (GS - F_s)_{lim=0} = 0$ while in level flight at 33,000 feet the shifting means 48 and 71' advance the TCR program memory from W1 data to W2 data; at which time the means Q values are automatically changed to $A_w = 15,000$ and consequently the placement of W2 is $L = 70$ miles and $D = 25$ miles from the GP of $F_s 1$. When the aircraft approaches W2 and the diminishing value $DME - K (GS - F_s)_{lim=0}$ equals zero, the waypoint shifting means 48 and 71' sense said arrival and automatically advance the TCR program memory to W3; at which time the formula values are automatically changed to $D = 0$, and consequently the placement of W3 is $L = 45$ miles from the GP of $F_s 1$. Again however, the Profile Indicator D hereinabove described will tell the pilot when the optimum energy path of $F_s 1$ is reached, and because the same 12 miles is required in order to slow down, the said path will be reached at 57 miles from the $GP_1$ of $F_s 1$. Therefore, when 57 miles from the $GP_1$ of $F_s 1$, ($DME = 12$) the pilot throttles back in response to the indications of his Profile Indicator as necessary and descends at cruise speed to the 10,000 feet level of the TCR where slowdown to 250 knots is a requirement; while making speed and altitude corrections as may be necessary to remain within the theoretical slope $F_s 1$ as is required by the Profile Indicator D. Departure from altitude at 15,000 feet is sensed by the waypoint shifting means 48 and 71' and the formula values are automatically changed to $A_w = 1,000$ and consequently the placement of W4 is $L = 3$ miles and $D = 0$ miles from the GP of $F_s 1$. The optimum energy profile between 15,000 feet and touchdown at 1,000 feet can be governed entirely by the Profile Indicator D as above described, and at touchdown $L = 3$, $D$ and $DME = 0$.

From the foregoing, it will be apparent that the basic measuring point for any locus or waypoint on any of the plurality of $F_s$ paths is the GP where both $D$ and $L$ equal zero. And with a slope factor such as $S = 3$, the $L$ factor locates the waypoints while the $D$ factor establishes the location of the $F_s$ paths.

The wind storage means R is a component that receives preceding wind shear data at the various altitudes along the selected TCR's for subsequent coordinated comparison with each in-flight aircraft being processed. Like the above described TCR selector and waypoint computer means K and the route selection and programmer means Q, the means R is adjustable to any one of a plurality of assigned TCR's at the terminal involved, and it is responsive to the selector means 71 above described, and comprises an altitude responsive triggering means 72, a data comparator means 73, and a wind shear memory means 74' and one for each of the ten aforementioned TCR programs. The selector means 71 is responsive to the TCR selection signal through distribution line 62 and the decoder thereof which identifies the program selected and activates the corresponding wind shear memory means 74'. The data comparator means 73 receives raw data from the in-flight aircraft being processed; namely the altitude signal through distribution line 64, the TAS signal through distribution line 66, and the GS signal through distribution line 67; and produces a positive or negative summation thereof as the wind shear value and thereby distinguishing between head winds and tail winds respectively. The triggering means 72 is responsive to the altitude signal through line 64, and placeably restores the then prevailing wind shear summation from means 73 into the memory means 74'. The said placement into the memory of said summation is made according to the value of the triggering altitude signal. Each recording of the current wind shear data is averaged with previously recorded data for that altitude, and consequently the current wind shear data is continuously restored into the memory and placed therein according to the altitude source thereof; each placement of recorded wind shear data being accompanied by a permanent invariable signal corresponding to the value of the triggering altitude signal and useable for its location. Thus, wind shear data is stored in means R according to altitude and TCR and is available when these factors are known.

The wind calculator and summator means SS is a component that receives wind shear data from the wind storage means R above described, emanating from memory means 74' thereof, and determines the affect of wind remaining to touchdown. Means SS involves a speed summator 100, a calculator 101 and a wind affect summator 102. The speed summator 100 is responsive to the wind shear signal through line 73' and to a feedback groundspeed signal (GS) from time prediction means U through line 67', so as to produce the corrected predicted speed (CPS) on the TCR and distance out from the terminal being processed. In practice, the scan of the wind shear data is performed by the means U later described and initiates at the altitude of the wind shear data which has just been re-recorded by the aircraft being processed. The bits of wind shear data are, in practice, divided into three mile increments to the terminal. The calculator 101 determines the remaining effective distance portion of the bit at the initiating altitude and divides said distance portion by the corrected predicted groundspeed so as to produce a time bit which is then summated with the remaining bits of wind affect and distance data to the waypoint. The wind affect summator 102 accumulates the scanned and calculated bits of wind affect-time data, to be available through a line 90.

The position computer means S is a component that calculates the required locus point of the processed in-flight aircraft along the TCR selected by the pilot and along which the aircraft is being navigated; and in accordance with the invention, operates upon the fundamental "aircraft capability" formula wherein the "position" or distance to the next waypoint is the unknown to be established for subsequent comparison with the known and then prevailing DME. The basic formula $P_w$ $= S (A - A_w/1,000) + K (GS - F_s)_{tim=0}$ is employed from the next waypoint and the invariable factors are $S = 3$, the denominator 1,000, while the variable in-flight data of the formula is the deceleration factor $K$ $(GS - F_s)_{tim=0}$ as derived through distribution line 63, the altitude A as derived through distribution line 64, and the waypoint altitude $A_w$ as derived through distribution line 65' from memory means 74. The means S produces a computed "position" signal through output line 78, the value of which represents the required distance to waypoint of the aircraft on its optimum energy path.

The position comparator V is a component that compares the computed distance to waypoint of the aircraft with the actual distance to waypoint thereof, comparing the positon computer means S output through line 78 with the DME output through distribution line 68. The means V has an output line 108 producing a position differential signal value indicating a plus or minus differential from the optimum computed distance to waypoint.

Figure 5:
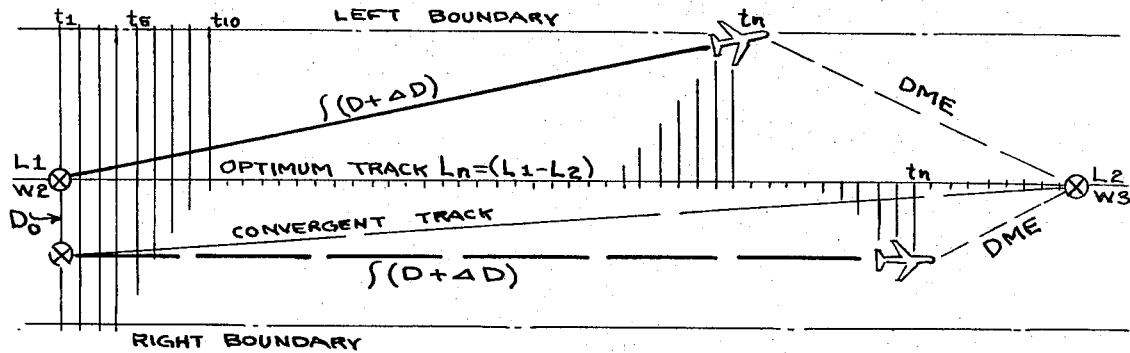
FIG. 5 is a plan view of a corridor and two typically possible aircraft operations therein.
Figure 6:
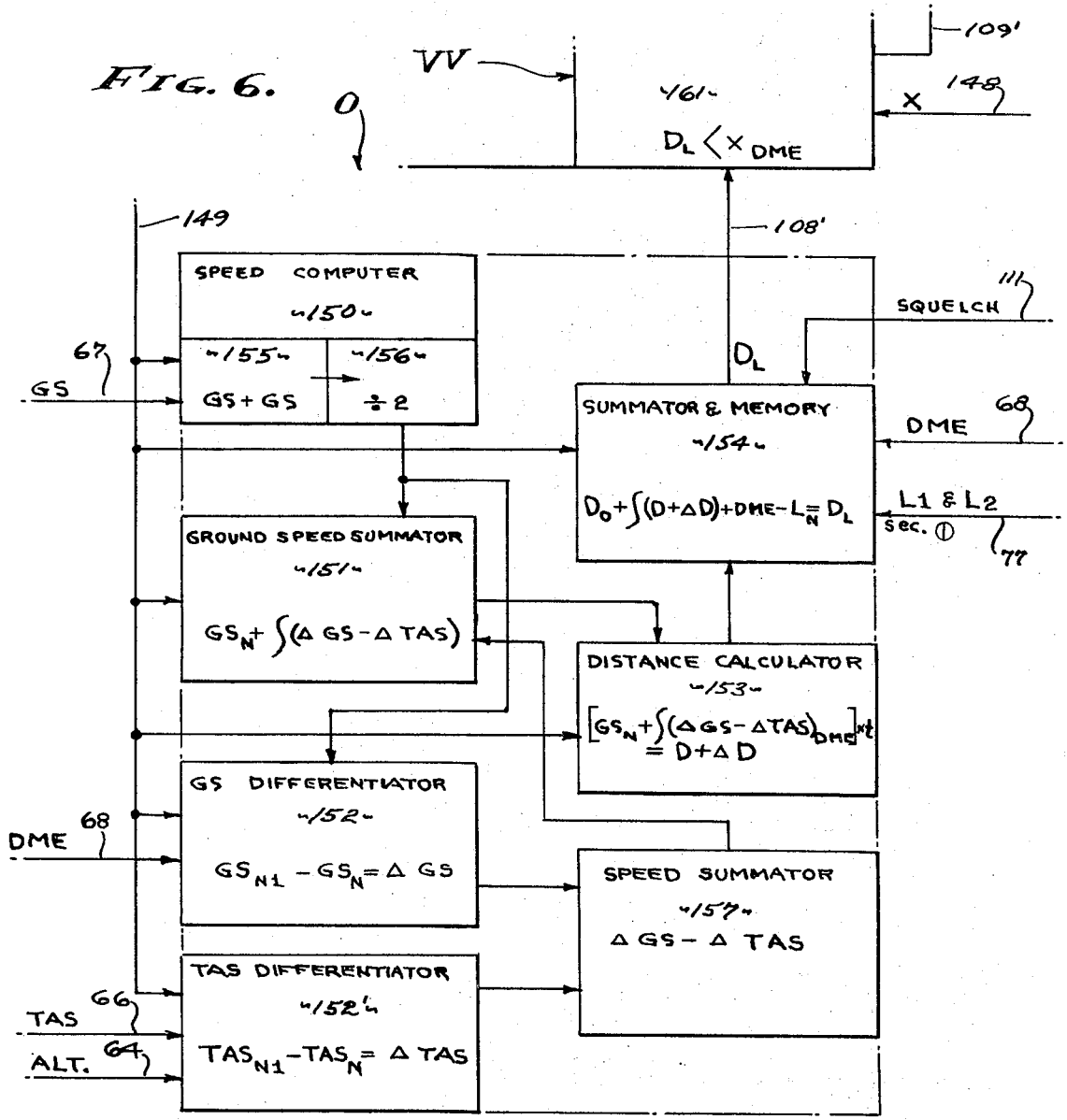
FIG. 6 is a detailed block diagram of the track boundary means shown in FIG. 3.

Two typical tracks are illustrated in FIG. 5 of the drawings, as they would appear extended within corridor boundaries between two L points $L_1$ and $L_2$; $L_n$ being the distance from a waypoint to a waypoint, for example from waypoint W2 to W3. In accordance with this invention the flight system is three dimensional as it involves the x, y and z axes on which the aircraft are operated within space tolerance, and as related to position in both the vertical profile and horizontal plane. It is the track boundary means 0 which limits aircraft deviation on the y axis in the horizontal plane of navigation, in order to confine the aircraft operation to established corridor limits. For example, a standardized corridor width is 8 miles with the optimum flight path or track per se extending centrally therethrough on the line $L_n$, and in referring to FIG. 5 it will be seen that deviations from the optimum track describe angular paths which have lateral limits. Said limits can be determined practically by trigonometric functions, but detection of such angular deviations in a narrow elongated corridor is impractical due to acute angulation and consequent lack of accuracy. However, lateral deviation from the optimum track is detected on a practical basis by comparing along-track factors, wherein accumulated distance data of the progressing aircraft is compared with a total distance factor and the difference therebetween subjected to a limiting factor. Accordingly, the track boundary means 0 (see FIG. 6) involves a speed computer 150 that determines the average speed of the processed aircraft, a groundspeed summator 151 that determines the forward progress of the processed aircraft, a groundspeed differentiator 152 that determines change ($\Delta GS$), a true airspeed differentiator 152' that determines change ($\Delta TAS$), a speed summator 157 that detects the difference between $\Delta GS$ and $\Delta TAS$, a distance calculator 153 that determines change of distances ($D + \Delta D$), and a summator and memory means 154 that sums the $DME$, $D + \Delta D$ and $L$ distance data, and all of which is based upon sequential time cycles preferably triggered through line 149 by the 10 second time cycle of the memory 85 of the time assignment means TA later described.

The speed computer 150 of the track boundary means 0 determines the average speed of in-flight aircraft during the sequential 10 second time cycle periods represented in FIG. 5 between time points $t1$, $t2$, t3, etc. The computer 150 has a first stage 155 with means triggered through line 149 to receive and sum sequentially spaced time spaced groundspeed data through distribution line 67, and it has a second stage 156 which means that divides (by two) the summation of stage 155 so as to provide the average speed for the time interval computed. It will be apparent that the time points t1, t2, t3, etc. occur sequentially at the beginning and end of uniform time intervals, and that said time points occur at spaced distance points as the processed in-flight aircraft progresses on its track. Accordingly, sequential computations are made by the speed computer; for example, the average speed in the intervals t1 − t2, t2 − t3, etc.

Referring again to FIG. 5 and in order to differentiate between a true deceleration and an apparent deceleration as caused by a deflection of the aircraft's track from the optimum $L_n$ track, a comparison between true airspeed from liine 66 and indicated groundspeed from line 67 is made. When the aircraft remains on the optimum track and decelerates, both the true airspeed and the groundspeed will decrease proportionately; a true deceleration. However, as the aircraft follows a track other than the optimum track and remains at constant speed, the true airspeed will remain constant while the groundspeed will decrease, an apparent deceleration that is used by the track boundary control, as follows: When a condition of true deceleration occurs, detecting means 157 discounts that part of the change in groundspeed attributed to true deceleration function by comparison with the fact that for any particular altitude, the change in true airspeed should be equal to the change in groundspeed for true deceleration. Any additional change in groundspeed will be apparent deceleration or apparent acceleration, and with these facts in mind it will be seen that the aircraft has flexibility as to path choice and deceleration within the track boundary and the system is capable of separating true deceleration or acceleration from apparent deceleration or acceleration. In other than level flight there is on an average a 4½ knot change in true airspeed relative to a constant calibrated airspeed for each thousand feet of change in altitude. Therefore, this factor is taken into consideration in measuring the difference between true and apparent rate of change of speed in other than level flight.

The groundspeed differentiator 152 is a subtraction means that receives the sequential average GS output signals from the speed computer 150 and subtracts one from the other. For example, the average GS in the interval t1 − t2 is subtracted from the average GS in the interval t2 − t3, etc. Said $\Delta GS$ is necessarily a function of DME at various angular deviations from the optimum track $L_n$, the effect proportional to the rate of change of speed and DME signal through distribution line 68 which determines the weight to be given to $\Delta GS$. For example, a 45° angle of deviation at 50 miles out will produce a far smaller $\Delta GS$ than the same deviation 5 miles out. Thus, the output of groundspeed differentiator 152 produces sequential change in speed ($\Delta GS$) signals.

The true airspeed differentiator 152' is a subtraction means that receives the sequential true airspeed output signals through distribution line 66 and subtracts one from the other. For example, the TAS in the interval t1 − t2 is subtracted from the TAS in the interval t2 − t3, etc. The corrective effect of altitude is intorduced into means 152' through distribution line 64. Thus, the output of true airspeed differentiator 152' produces sequential change in speed ($\Delta$ TAS) signals.

The speed summator 157 of the track boundary means 0 determines the effective change of speed ($\Delta GS - \Delta TAS$) of the in-flight aircraft during the sequential 10 second time cycle periods represented in FIG. 5 between the time points t1, t2, t3, etc. Speed summator 157 is a subtraction means that receives the complementary speed difference signals from differentiators 152 and 152' and subtracts one from the other to produce the sum of the effective change in groundspeed ($\Delta GS - \Delta TAS$).

The groundspeed summator 151 of the track boundary means 0 determines the effective groundspeed of the in-flight aircraft along its track during the sequential 10 second time cycle periods represented in FIG. 5 between the time points t1, t2, t3, etc. The computer 151 is a summating means that receives the average GS output of computer 150 and the sum of the effective change in groundspeed ($\Delta GS - \Delta TAS$) from summator 157, and summates these two signals according to the formula $GS_n + \int (\Delta GS - \Delta TAS)$ so as to produce an effective grounspeed signal to be used subsequently in determining distance of the in-flight aircraft along its track.

The distance calculator 153 of the track boundary means 0 determines effective distance ($D + \Delta D$) traveled by the in-flight aircraft during the sequential 10 second time cycle periods represented in FIG. 5 between the time points t1, t2, t3, etc. The calculator 153 is a multiplying means that receives the effective groundspeed signal of the summator 151 and multiplies it by the value of the time interval as triggered through line 149. Thus, the effective distance ($D + \Delta D$) for each sequential time interval is determined.

The summator and memory means 154 of the track boundry means 0 sums both calculations $D$ and $\Delta D$ with the known DME distance data and subtracts therefrom the known distance Ln, for example between $L_2$ and $L_3$, and is a summator means having a memory storage for all functions of the means 0 and recall means located in time assignment means TA, later described, and which transmits and receives signals through line 149 for each involved aircraft wherein the total of the time interval distance values $D$ and $\Delta D$ are accumulated and the $L_2 - L_3$ distance subtracted therefrom for comparison with the prevailing DME against a programmed limiting factor X supplied through line 148 to the space tolerance means VV later described. Accordingly, the means 154 receives the time cycled output signals ($D + \Delta D$) from the distance calculator 153 (see FIG. 6) summating the same and holding the summation in memory; and separately the means 154 adds to the foregoing summation the value of the prevailing DME signal through distribution line 68 and subsequently subtracts therefrom the optimum track distance or $L_n$ signal through line 77, which is for instance $L_2 - L_3$, thereby arriving at a computed and/or calculated deviation ($D_L$) of the in-flight aircraft and which is to be compared with the permissible limit factor X thereof in the means VV next to be described.

Referring to FIG. 5, the center of the illustration is that of an aircraft that entered the $L_n$ leg on the optimum track; but perfection in navigation is not likely. Therefore, the lower half of the illustration is that of an aircraft that entered the $L_n$ leg offset from the optimum track and in which case the convergent track becomes a substitute for the optimum track; and there are, of course, many variations and one of which is shown wherein the offset aircraft continues on a parallel track $\int (D + \Delta D)$. A feature of this invention is that the $L_n$ legs of flight between waypoints are processed separately, the previous processing being canceled, there being a sensor means (not shown) that senses the passing by of the waypoints, preferably through detection of the lowest DME reading which is retained in memory means as a base $D_o$ factor to be summated with the $D$ and $\Delta D$ and the prevailing DME as described above; thereby accounting for the offset entry of the aircraft into each successive $L_n$ leg of flight. The said base $D_o$ value is incrementally reduced and thereby removed as the $L_n$ distance diminishes. The X factor retained in memory for comparison can be an approximation or is preferably a variable factor established for each time-distance interval along the $L_n$ leg. That is, X is nonlinear and is a function of distance from the waypoint, and in practice from the waypoint ahead of the aircraft, in which case the DME is employed and determinably selects the X factor out of memory in means Q, to be applied in placing the corridor boundary according to the nonlinear functions involved.

When the track boundary control is utilized in other than level flight, there is a difference between the distance from $L_1$ to $L_2$ for example and the distance measured by the DME, because the DME reads horizontally. When decending on a 3° slope the additional distance equal to the DME reading times the secant of the angle of 3° would be necessary to adjust the DME reading to the remaining distance along the actual track flown. Therefore, installed in summator and memory means 154 is the said correction factor for a 3° path, for example, times the DME reading to be used when the aircraft is on a descent profile to differentiate between a descent profile and level flight. There is a line coming from squelch means SV to summator and memory means 154 which would allow this correction factor to be effective during the descent and climb profile but not in level flight.

In order to use the track boundary system in a climb profile it would be necessary to determine the climb angle between any two successive waypoints and to make a correction to the DME which would be the secant of that angle times the DME reading for the position of the aircraft relative to the waypoint; and as the climb angle decreased in the climb sector by sector, to successively compute the secant of the angle between any two waypoints and apply the computation to the correction factor for the DME reading successively. This correction factor is to be installed in means Q and is fed to the track boundary along with the L factor with which the track boundary is concerned. The means 150, 151, 152, 152', 153 and 154 receive restored memory for summating and/or averaging, through line 149 from the means TA.

The space tolerance means VV is a two channel component, with a channel 160 that determines the permissible deviation from the optimum remaining distance to a waypoint that is predicted by the position computer S, and with a channel 161 that determines when there is a track deviation amounting to a boundary infringement as determined by the track boundary means O. Channel 160 determines the plus or minus variance from the computed distance and initiates an alert signal when the permissible x axis deviation is exceeded. The formula employed to operate channel 160 of means VV is for example $3 > 4$ percent $P_w > 1$, so that when the output of position computer V through line 108 is a value greater than the predetermined 4 percent of said $P_w$ but no greater than 3 or less than 1, a comparator circuit in said means issues an alert signal from means VV through line 109.

Channel 161 of space tolerance means VV determines when $D_L$ infringes upon the programmed space limiting factor X which emanates from the TCR programmer means Q through line 148 and initiates an alert signal when the permissible y axis deviation is exceeded. The formula employed to operate channel 161 of means VV is for example $D_L < X$, so that when the $D_L$ output of the track boundary means O through line 108' is a plus value greater than the X signal through line 148 a comparator circuit in said means issues an alert signal to monitor means MS and a deactivating signal to the triggering means 72 through a line 109'. Thus, either channel 160 or 161 provides a signal indication when an intolerably potential dangerous space deviation occurs.

The squelch means SV is a component that holds the space tolerance alert signal through line 109 in abeyance during the level flight portions of the TCR, during which portions of the descent phenomenon of the "aircraft capability" formula is inapplicable, and switches off the alert signal through line 109 when the aircraft remains within tolerable confines of the required waypoint altitude. The formula employed to operated means SV is, for example $+1 > S(A-A_w/1,000) > -1$, the $S = 3$ and 1,000 being invariable, the $A$ = altitude being derived through distribution line 64, and the programmed $A_w$ = altitude of the waypoint being derived through distribution line 65' from the programmer means Q. When the input result is a plus value greater than the predetermined $+1$, or when the input result is a minus value greater than the predetermined $-1$, a switch 110 is closed through line 109' so as to transmit the alert signal to the monitor means MS, and to deactivate triggering means 72. In practice, both the plus and minus tolerance can require, for example, a 333 foot variation. Therefore, only if the aircraft deviates more than 333 feet from the required altitude will the alert signal advise the control authority of said variance.

The waypoint verifying means WV is a component that establishes that all data satisfies the formula, namely the in-flight $A_w$ and the programmed L and D data out of the route selection and programmer means Q. The means WV is preferably an analog computer which is balanced for verification when all variable data is in compliance with the formula value requirements; and otherwise an imbalance actuates a malfunction signal means through line 79. The formula employed to operate means WV is as follows:

$$L = S(A_w/1,000) + D$$

The invariable factors are $S = 3$, and the denominator is 1,000. The $A_w$ data is received through distribution line 65. The L and D is derived from the programmer means Q through distribution line 77 which passes a verification switch 80 that is closed only when the formula is satisfied. Therefore, any data discrepancies will cause a malfunction signal that will alert the monitor means MS of the TCC and the AIC through telemetering channel (9).

The speed comparator means T is a component that compares the corrected predicted groundspeed with the actual GS as telemetered from the AIC and derived through distribution line 67. Predicted groundspeed for different portions and/or legs of the TCR is stored in the memory 87 of means U and available therefrom through line 67', triggered for example by the distance of the in-flight aircraft to the terminal; and this programmed predicted speed is adjusted by the wind shear data through line 90' so as to provide a corrected predicted speed (CPS) which is then compared with the actual groundspeed input through line 67. The means T has an output line 105 producing a signal value indicating a slow or fast speed differential, as the case may be.

The time prediction means U is a component that establishes a corrected remaining time to touchdown at the terminal of destination, i.e., ETA. As shown, the means U comprises a scan trigger means 81, and like computer means K and programming means Q the means U is adjustable to any one of a plurality of assigned TCR's at the terminal involved, and also comprises program means 87 containing predicted altitude, predicted still-air groundspeed and identity distance to waypoint (terminal or touchdown) and one program for each of said TCR's, a scanner means 88, and time summator means 91. Said program means 87 is responsive to the TCR selection signal through means 71 and the decoder thereof which identifies the program selected and activates the corresponding program means 87. Each program 87 for a selected TCR is impressed with an invariable memory containing still-air data including predicted altitude and predicted groundspeed and identity distance to waypoint for each three mile distance bit impressed therein. The programs 87 are selectively readable by scanner means 88 which is responsive to a distance value signal from the scan trigger means 81, and analog circuit having an L input from the programmer means Q through line 77 and DME input from the in-flight data through distribution line 68. The analog circuit of comparator 81 summates the formula $DME + L - S (A_t/1,000)$ and produces a remaining distance to waypoint which is employed by the scanner means 88 to locate data at said remaining distance on program 87 so as to trigger the predicted altitude and predicted groundspeed data therefrom. The $S$ ($A_t/1,000$) which is the negative distance from touchdown to $GP_1$, where $A_t$ is the altitude of the terminal, is a selectively set value of minus 3 in the example given. The predicted true data is processed by time summator means 91 which is in the form of an analog circuit responsive to the time bit data through line 90 and producing a corrected time to touchdown signal through a line 92.

Referring now to the time assignment means TA, dynamic memory means 82 and 83 are provided and preferably solid state means through which information is alternately processed synchronously as controlled by a timer 85 so as to establish the repeated processing cycles of 10 seconds. Accordingly, a recorder means 86 is provided to alternately store information into the memory means 82 and 83 respectively, and a reader means 84 is provided to alternately withdraw information from the memory means 82 and 83 respectively. In practice, the timer 85 is a phase shifter that reversely activates the recorder means 86 and reader means 84, so that current information is recorded in one memory means while previously recorded information is simultaneously withdrawn from the other memory means, and vice versa. The information recorded and subsequently read from memory means 82 and 83 is the corrected time to touchdown signal through line 92 from the time predictor U and the ident signal through line 61' from transponder means LL and the computed sum $(D + \Delta D) + D_o$ signal through line 149, the three signals being individually stored in the memory means. A feature is the separation of these three signals and the forwarding of comparative independently detectable time to touchdown signals and the forwarding of the corresponding ident signals that feed back to transponder means LL from the reader means 84 through line 61''. To these ends, reader means 84 has an inspection directive, and a feedback is provided in line 61'' which issues from the reader 84 and extends back to the transponder means LL for triggering in-flight data from the aircraft being processed. Thus, there is a storage of time to touchdown and associated ident information and the sum of $(D + \Delta D) + D_o$ recorded into alternate memories every 10 seconds.

The time to touchdown signals recorded on the memory means 82 or 83 and retained for two phase shifts yield the sequentially related time remaining to touchdown value of all identified in-range aircraft being processed by the TCC. The reader means 84 has, therefore, two directives, first a dual channel scan directive in a means that searches said restored ten second old information for the specific purpose of comparing the time to touchdown of the next following aircraft with that of the aircraft being processed. In practice, a zero to 3,000 second search in effective flight time is sufficient to extend to all possible in-range aircraft, said search being easily accomplished electronically within said 10 second time cycle, beginning with the nearest aircraft to touchdown and seeking sequentially the next larger remaining time to touchdown signal values recorded in the memory being searched. A feature is the introduction and insertion into memory in the TCC of each transponding aircraft and the sequential calling up of said aircraft for processing. In present practice, transponding involves several channels of information and the initiating ident signal is received through an exclusive ident channel from each aircraft and placed in an ident memory means 165 according to its time of reception and subject to individual successive removal therefrom. The purpose of ident memory means 165 is to receive new aircraft arrivals without interfering with the processing of other aircraft in memories 82 and/or 83. The zero to 3,000 second search of reader 84 has a reserve search section, for example from 2,991 to 3,000 sec. during which trigger means 166 extracts sequential ident information stored in memory 165 and removing it while simultaneously returning said ident information as a signal through line 165'. Accordingly, each transponding aircraft is placed in memory and when any one of said idented aircraft and its time to touchdown recording is sought out for processing through one channel, its associated ident recording is then available and feeds back through a second channel to transponder means LL so as to trigger the in-flight data from the aircraft having that identity. Simultaneously with this sequential selective dual scanning of all processed in-range aircraft, the time remaining to touchdown signal of the next following aircraft is also withdrawn from memory. Therefore, a single channel scan directive in a means that searches said restored 10 second old information is triggered by the aforementioned dual channel means finding its said next larger remaining signal value and seeks sequentially the next larger remaining time to touchdown signal value recorded in the memory being searched. The said time to touchdown signals detected by said dual and single channel means are withdrawn from reader 84 through lines 94' and 94'' for subsequent processing in a comparator means 95 that determines the time interval therebetween and which is forwarded through line 96 to the stranger alert means SA next to be described.

Figure 4:
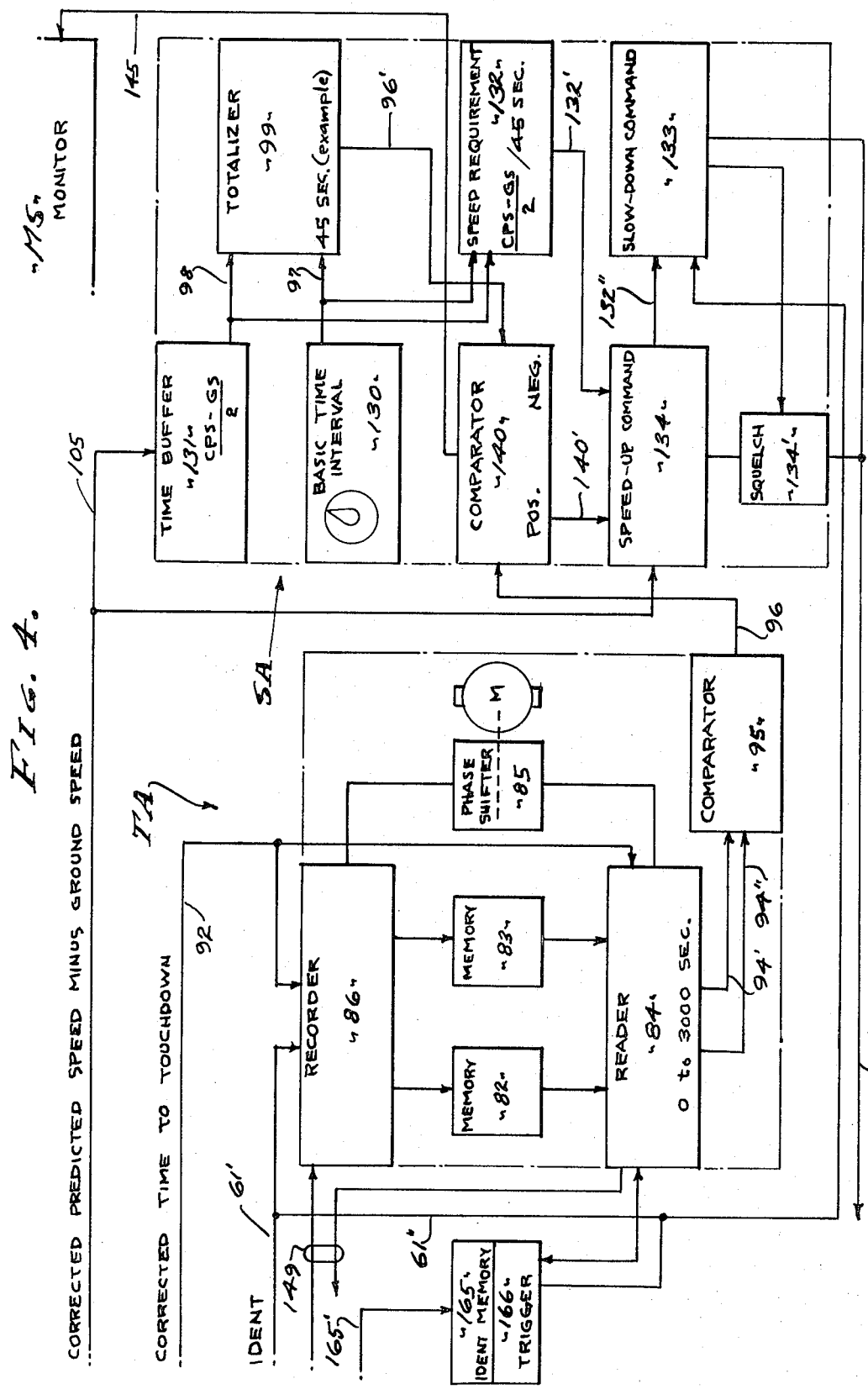
FIG. 4 is a detailed block diagram of the Time Assignment means (TA) shown in FIG. 3.

The stranger alert means SA is a component that limits the proximity of next adjacent aircraft to a predetermined time interval plus a variable buffer, and that issues speed-up and slow-down signals to aircraft selected thereby as best capable of performing the speed change required in order to effect the required time spacing. The time spacing for all inrange aircraft is established by the basic directive, for example, that no two aircraft shall be within 45 seconds of each other. If a time infringement does occur, then the means SA compares the groundspeed (GS) and the corrected predicted speed (CPS) of the processed aircraft and decides whether or not to issue a speed up requirement, and if a speed up of the processed aircraft is not permissible of slow down requirement is issued to the next following aircraft, all according to time remaining to touchdown as detected by this inspection. The speed requirement signals are enabled by the speed comparator means T which produces the signal that shows whether or not the processed aircraft can make the required speed change. As best shown in FIG. 4 of the drawings, the means SA involves a time interval generator 130, a buffer generating means 131, a time totalizing means 99, a time to touchdown comparator means 140, a speed requirement generator means 132, a slowdown command memory means 133, and a speed-up command means 134. The above enumerated means are responsive to the signal values through lines 96 from the time assignment means TA, and 105 from the speed comparator means T.

Referring now to the time interval generator 130, the basic time interval directive is selectively variable from 45 seconds to greater values as is controlled by a manually adjustable means as circumstances require, having an output line 97 transmitting a basic time interval signal.

Referring now to the buffer generating means 131 which divides $CPS - GS$ from line 105 by two, a buffer is produced to be added to the basic time interval directive produced by generator 130. The formula $CPS - GS/2$ is satisfactory for present day aircraft, affording a reasonable buffer margin when two proximate aircraft are operating at different speeds. As shown, means 131 has a time buffer output line 98 transmitting a variable buffer signal which affords a margin for speed correction.

The basic interval and buffer signals through lines 97 and 98 are summed in the totalizing means 99, thereby establishing a required time separation between the aircraft being processed and the next following aircraft. In accordance with the invention, this total time separation required issues from means 99 through line 96' for comparison with the time interval signal issued from comparator 95 through line 96. Accordingly, the comparator means 140 receives said two time oriented signals and produces therefrom either a positive signal through line 140' or a negative absent signal (requires no transmission), these two alternate signals being controlling in the determination of issuing command signals from means 133 and 134 next to be described. It is significant that in any event there will be a functioning of comparator means 140 issuing either a positive or negative signal, the directive of said means being to issue a speed-up (positive) command through line 140' when the signal value in line 96 is less than the signal value in line 96', and to simultaneously alert the monitor means MS to this time infringement through line 145. Alternately, if the means 140 issues a negative signal, the directive of said means is to take no action upon the aircraft then being processed.

The speed-up and slow-down command means 134 and 133 transmit a signal value received from the speed requirement generator means 132 which calculates the amount of acceleration or deceleration required. In practice, the means 132 employs the formula $CPS - GS/2$ divided by the basic time interval established by the time interval generator 130. Therefore, lines 97 and 98 extend to the means 132 to be processed into a proportional speed requirement signal issuing to command means 133 and 134 through line 132'.

The speed-up command means 134 involves a blocking means responsive to the formula $CPS - GS$ through line 105 and has the directive to pass the proportional speed requirement signal from means 132 only when the processed aircraft has the capability of accelerating. That is, only when the resultant of line 105 is a positive signal, when the groundspeed GS is less than the corrected predicted speed CPS plus a percentage of CPS that the aircraft speed envelope will allow, is the means 134 switched so as to pass the signal from line 132' to output line 70; and on the contrary when the resultant of line 105 is a negative signal, when GS substantially equals or exceeds the CPS plus a percentage of CPS that the aircraft speed envelope will allow, means 134 transfers the signal from 132' through line 132'' and into the slowdown command memory means 133. Thus, when a time infringement exists and cannot be corrected by the aircraft being processed, the corrective signal value is placed into memory in the command means 133 for subsequent employment in directing the next following aircraft to be processed.

Said next following aircraft to be processed is subjected to each and every function hereinabove described when the processing of the aircraft preceding it is completed, and in practice the operation of the most time consuming component of the system is employed as the trigger for advancing the processing from one aircraft to the next. For example, the time predictor means U is perhaps the most time consuming in its operation and its output signal through line 92 is used as a pulse to advance the reader 84 to the next pair of proximate aircraft, all as hereinabove described. Accordingly and upon the stepped up positioning of the reader 84, the next following aircraft is processed and its ident call established etc., following which the speed requirement signal retained in the slow-down command memory means 133 is triggered by the signal pulse in line 61'' to issue into output line 70. A feature is the squelch means 134' which responds to a signal from the memory of means 133 and which then blocks any conflicting directive to the aircraft then being processed and so as to give the previously stored slowdown requirement effect without interrupting full processing thereof which could affect next following aircraft.

Having described only a typical preferred form and application of my invention, I do not wish to be limited or restricted to the specific details herein set forth, but wish to reserve to myself any modifications or variations that may appear to those skilled in the art.

I claim:

1. In combination: aircraft borne instrumentation comprising, means generating an altitude signal, means generating a waypoint altitude signal, and telemetering means transmitting said aforementioned signals as in-flight navigational data; and a remote based computer comprising, telemetering means receiving said aforementioned signals, and position computer means relating said aforementioned signals and processing the same each according to its effect into a computed distance to said waypoint signal.

2. The combined airborne instrumentation and remote based computer as set forth in claim 1 and wherein the position computer means relates said aforementioned in-flight data signals and said waypoint altitude signal and processes the same according to the ascent formula $P_{wc} = S (A_w - A/1,000)$; wherein $P_{wc}$ is the computed distance from waypoint in ascent, $S$ is the slope constant, $A_w$ is altitude of the waypoint, and $A$ is the aircraft altitude.

3. The combined airborne instrumentation and remote based computer as set forth in claim 1, wherein the aircraft borne instrumentation includes means generating a deceleration requirement signal and said telemetering means transmits said signal, and wherein said means relating said aforementioned signals processes said deceleration requirement signal according to its effect into said computed distance to said waypoint signal.

4. The combined airborne instrumentation and remote based computer as set forth in claim 1, wherein the aircraft borne instrumentation includes means generating a groundspeed signal and means generating a deceleration requirement signal and said telemetering means transmits the same, and wherein the position computer means relates said aformentioned inflight data, said groundspeed signal, said deceleration requirement and said altitude and waypoint altitude signals and processes the same according to the formula $P_{wd} = S (A - A_w/1,000) + K (GS - F_s)_{lim=0}$; wherein $P_{wd}$ is the computed distance from waypoint in descent, $S$ is the slope constant, $A$ is the aircraft altitude, $A_w$ is altitude of the waypoint, $K$ is the variable conversion factor, $GS$ is the groundspeed, and $F_s$ is the predetermined minimum speed.

5. The combined airborne instrumentation and remote based computer as set forth in claim 1 and wherein the aircraft borne instrumentation includes means generating a groundspeed signal, means generating a deceleration requirement signal and said telemetering means transmits the same, and said means relating said aforementioned signals and processing in-flight data including groundspeed according to the formula $K (GS - F_s)_{lim=0}$; wherein $K$ is the variable conversion factor, $GS$ is the groundspeed, and $F_s$ is the predetermined minimum speed.

6. The combined airborne instrumentation and remote based computer as set forth in claim 1, wherein the aircraft borne instrumentation includes means generating a groundspeed signal, means generating a deceleration requirement signal and said telemetering means transmits the same, and means relating said aforementioned signals and processing in-flight data including groundspeed according to the formula $K (GS + F_s)_{lim=0}$, and wherein the position computer means relates said aforementioned in-flight data signals and said waypoint altitude signal and processes the same according to the formula $P_{wd} = S (A - A_w/1,000)$ plus the aforementioned formula $K (GS - F_s)_{lim=0}$; wherein $P_{wd}$ is the computed distance from waypoint in descent, $S$ is the slope constant, $A$ is the aircraft altitude, $A_w$ is the altitude of the waypoint, $K$ is the variable conversion factor, $GS$ is the groundspeed, and $F_s$ is the predetermined minimum speed.

7. In combination: aircraft borne instrumentation comprising, means generating an altitude signal, means generating a waypoint altitude signal, means generating a remaining distance signal, and telemetering means transmitting said aforementioned signals as in-flight navigational data; and a remote based computer comprising, telemetering means receiving said aforementioned signals, position computer means relating said aforementioned signals and processing the same each according to its effect into a computed distance to said waypoint signal, and position comparator means relating said remaining distance signal and computed distance to said waypoint signal and producing a position differential signal for operation of and monitoring of the aircraft.

8. The combined airborne instrumentation and remote based computer as set forth in claim 7 and wherein the position computer means relates said aforementioned in-flight data signals and processes the same according to the ascent formula $P_{wc} = S (A_w - A/1,000)$; wherein $P_{wc}$ is the computed distance from waypoint in ascent, $S$ is the slope constant, $A_w$ is altitude of the waypoint, and $A$ is the aircraft altitude.

9. The combined airborne instrumentation and remote based computer as set forth in claim 7, wherein the aircraft borne instrumentation includes means generating a deceleration requirement signal and said telemetering means transmits said signal, and wherein said means relating said aforementioned signals processes said deceleration requirement signal according to its effect into said computed distance to said waypoint signal.

10. The combined airborne instrumentation and remote based computer as set forth in claim 7, wherein the aircraft borne instrumentation includes means generating a groundspeed signal and means generating a deceleration requirement signal and said telemetering means transmits the same, and wherein the position computer means relates said aforementioned in-flight data, said deceleration requirement and said altitude and waypoint altitude signals and processes the same according to the formula $P_{wd} = S (A - A_w 1,000) + K (GS - F_s)_{lim=0}$; wherein $P_{wd}$ is the computed distance from waypoint in descent, $S$ is the slope constant, $A$ is the aircraft altitude, $A_w$ is altitude of the waypoint, $K$ is the variable conversion factor, $GS$ is the groundspeed, and $F_s$ is the predetermined minimum speed.

11. The combined airborne instrumentation and remote based computer as set forth in claim 7 and wherein the aircraft borne instrumentation includes means generating a groundspeed signal, means generating a predetermined minimum speed signal, and means relating said aforementioned signals and processing in-flight data into a deceleration requirement signal according to the formula $K(GS - F_s)_{lim=0}$ and said telemetering means transmits the same; wherein $K$ is the variable conversion factor, $GS$ is the groundspeed, and $F_s$ is the predetermined minimum speed.

12. The combined airborne instrumentation and remote based computer as set forth in claim 7, wherein the aircraft borne instrumentation includes means generating a groundspeed signal, means generating a predetermined minimum speed signal, and means relating said aforementioned signals and processing in-flight data into a deceleration requirement signal according to the formula $K(GS - F_s)_{lim=0}$ and said telemetering means transmits the same, and wherein the position computer means relates said aforementioned in-flight data signals and processes the same according to the formula $P_{wd} = S(A - A_w/1,000)$ plus the aforementioned formula $K(GS - F_s)_{lim=0}$; wherein $K$ is the variable conversion factor, $GS$ is the groundspeed, $F_s$ is the predetermined minimum speed, $P_{wd}$ is the computed distance from waypoint in descent, $S$ is the slope constant, $A$ is the aircraft altitude, and $A_w$ is altitude of the waypoint.

13. In combination: aircraft borne instrumentation comprising, means generating an altitude signal, means generating a waypoint altitude signal, means generating a remaining distance signal, and telemetering means transmitting said aforementioned signals as in-flight navigational data; and a remote based computer comprising, telemetering means receiving said aforementioned signals, position computer means relating said aforementioned signals and processing the same each according to its effect into a computed distance to said waypoint signal, position comparator means relating said remaining distance signal and computed distance to said waypoint signal and producing a position differential signal, and space tolerance means establishing permissible deviation from the remaining distance and with a comparator means determining when said position differential signal is a value greater than a predetermined value and with alert means issuing an alert signal when said determination is made by said comparator means, said alert signal being useful for operation of and monitoring of the aircraft.

14. The combined airborne instrumentation and remote based computer as set forth in claim 13 and wherein the said last mentioned comparator means determines when said position differential signal is a value greater than a predetermined maximum value.

15. The combined airborne instrumentation and remote based computer as set forth in claim 13 and wherein the said last mentioned comparator means determines when said position differential signal is a value lesser than a predetermined minimum value.

16. The combined airborne instrumentation and remote based computer as set forth in claim 13, wherein the said last mentioned comparator means determines when said position differential signal is either greater than a predetermined maximum value or said position differential signal is lesser than a predetermined minimum value, and wherein said alert means issues an alert signal when either determination is made.

17. The combined airborne instrumentation and remote based computer as set forth in claim 13, wherein the aircraft borne instrumentation includes means generating a deceleration requirement signal and said telemetering means transmits said signal, wherein said means relating said aforementioned signals processes said deceleration requirement signal according to its effect into a computed distance to said waypoint signal, and wherein the said last mentioned comparator means determines when said position differential signal is a value greater than a predetermined maximum value.

18. The combined airborne instrumentation and remote based computer as set forth in claim 13, wherein the aircraft borne instrumentation includes means generating a deceleration requirement signal and said telemetering means transmits said signal, wherein said means relating said aforementioned signals processes said deceleration requirements signal according to its effect into said distance to said waypoint signal, and wherein the said last mentioned comparator means determines when said position differential signal is a value lesser than a predetermined minimum value.

19. The combined airborne instrumentation and remote based computer as set forth in claim 13, wherein the aircraft borne instrumentation includes means generating a deceleration requirement signal and said telemetering means transmits said signal, wherein said means relating said aforementioned signals processes said deceleration requirement signal according to its effect into said computer distance to said waypoint signal, and wherein the said last mentioned comparator means determines when said position differential signal is either greater than a predetermined maximum value an alternately lesser than a predetermined minimum value, and wherein said alert means issues an alert signal when either determination is made.

20. The combined airborne instrumentation and remote based computer as set forth in claim 13, there being level flight squelch means holding the said alert signal in abeyance responsive to altitude deviation sensing means.

21. The combined airborne instrumentation and remote based computer as set forth in claim 13, there being level flight squelch means holding the said alert signal in abeyance responsive to altitude deviation sensing means determining when the altitude signal deviates greater than a predetermined tolerance value.

22. The combined airborne instrumentation and remote based computer as set forth in claim 13, wherein the said last mentioned comparator means determines when said position differential signal is either greater than a predetermined maximum value and alternately lesser than a predetermined minimum value, and wherein said alert means issues an alert signal when either determination is made, there being level flight squelch means holding said alert signal in abeyance responsive to altitude deviation sensing means.

23. The combined airborne instrumentation and remote based computer as set forth in claim 13, wherein the said last mentioned comparator means determines when said position differential signal is either greater than a predetermined maximum value and alternating lesser than a predetermined minimum value, and wherein said alert means issues an alert signal when either determination is made, there being level flight squelch means holding the said alert signal in abeyance responsive to altitude deviation sensing means determining when the altitude signal deviates greater than a predetermined tolerance value at which time the squelch means is ineffective.

* * * * *